(12) United States Patent
Ko et al.

(10) Patent No.: US 11,635,632 B2
(45) Date of Patent: Apr. 25, 2023

(54) MIRROR-BASED MICROELECTROMECHANICAL SYSTEM FOR OPTICAL IMAGE STABILIZATION

(71) Applicant: Google LLC, Mountain View, CA (US)

(72) Inventors: Jamyuen Ko, San Jose, CA (US); Chung Chun Wan, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 68 days.

(21) Appl. No.: 17/228,047

(22) Filed: Apr. 12, 2021

(65) Prior Publication Data

US 2021/0294112 A1   Sep. 23, 2021

Related U.S. Application Data

(60) Provisional application No. 63/167,407, filed on Mar. 29, 2021.

(51) Int. Cl.
| | |
|---|---|
| *G02B 27/64* | (2006.01) |
| *G03B 5/00* | (2021.01) |
| *G03B 17/17* | (2021.01) |
| *G03B 3/06* | (2021.01) |

(52) U.S. Cl.
CPC ............ *G02B 27/646* (2013.01); *G03B 3/06* (2013.01); *G03B 5/00* (2013.01); *G03B 17/17* (2013.01); *G03B 2205/0023* (2013.01)

(58) Field of Classification Search
None
See application file for complete search history.

(56) References Cited

U.S. PATENT DOCUMENTS

| | | |
|---|---|---|
| 8,416,482 B2 | 4/2013 | Desai |
| 8,687,276 B2 | 4/2014 | Cho et al. |
| 2006/0152106 A1* | 7/2006 | Yan ...................... G02B 26/101 359/200.7 |

(Continued)

FOREIGN PATENT DOCUMENTS

WO   2014111920   7/2014

OTHER PUBLICATIONS

Lani, "2D tilting MEMS micro mirror integrating a piezoresistive sensor position feedback", Feb. 2015, 7 pages.

*Primary Examiner* — Derek S. Chapel
(74) *Attorney, Agent, or Firm* — Colby Nipper PLLC (57) ABSTRACT

This document describes a mirror-based microelectromechanical system (MEMS) for optical image stabilization in image-capture systems. The mirror-based MEMS includes a MEMS platform that can rotate about a pitch axis and/or a yaw axis. MEMS rotors drive rotational motion of the MEMS platform. One or more piezo films, flexibly connected to the stationary platform, extend over the MEMS rotors. The piezo films have a resistance value that varies when the piezo films are deformed by the MEMS rotors. The piezo films form a bridge circuit across the MEMS platform, which produces an output voltage that varies with the resistance values. A MEMS mirror, coupled to the MEMS platform, reflects light rays to an image sensor. A microcontroller receives pitch and yaw information from the image sensor. The microcontroller accesses the output voltage and determines how much to move the MEMS platform to compensate for the pitch and yaw of the camera.

12 Claims, 5 Drawing Sheets

(56) References Cited

U.S. PATENT DOCUMENTS

| | | | |
|---|---|---|---|
| 2008/0152333 A1* | 6/2008 | Yamasaki | G03B 5/00 396/55 |
| 2011/0199284 A1* | 8/2011 | Davis | G01L 5/0042 73/778 |
| 2022/0196806 A1* | 6/2022 | Loya | G01S 17/08 |

* cited by examiner

MIRROR-BASED MICROELECTROMECHANICAL SYSTEM FOR OPTICAL IMAGE STABILIZATION

RELATED APPLICATION

This application claims priority under 35 U.S.C. § 119(e) to U.S. Provisional Patent Application Ser. No. 63/167,407 filed Mar. 29, 2021, the disclosure of which is incorporated by reference herein in its entirety.

SUMMARY

This document describes techniques and apparatuses including a mirror-based microelectromechanical system (MEMS) for optical image stabilization in image-capture systems. In some aspects, a MEMS stationary frame is configured to be electrically connected to a substrate. A MEMS platform is electrically and rotationally coupled to the MEMS stationary frame and is configured for rotational motion about either or both of a pitch axis or a yaw axis with respect to the MEMS stationary frame. A MEMS rotor is provided between the MEMS stationary frame and the MEMS platform. The MEMS rotor is configured to drive the rotational motion of the MEMS platform. A piezo film is flexibly connected to the stationary platform and extends over the MEMS rotor. The piezo film is configured to have a first electrical resistance value when not deformed by the MEMS rotor and to have a second electrical resistance value when deformed by the MEMS rotor. The second electrical resistance value varies based on the amount of deformation. The piezo film can also form a bridge circuit across the MEMS platform, which is configured to produce an output voltage based on the first and second electrical resistance values. A MEMS mirror is coupled to the MEMS platform and is configured to reflect light rays to an image sensor of a camera that is communicatively connected to the substrate. A microcontroller is electrically connected to the MEMS platform and is configured to receive pitch and yaw orientation information from the camera. The pitch and yaw orientation information can indicate a camera-pitch angle and a camera-yaw angle. The microcontroller can access the output voltage and determine a mirror-pitch angle of the MEMS mirror and a mirror-yaw angle of the MEMS mirror based on the output voltage. The microcontroller can control the rotational motion of the MEMS platform, using the MEMS rotor, to compensate for the camera-pitch angle and the camera-yaw angle based on the mirror-pitch angle of the MEMS mirror and the mirror-yaw angle of the MEMS mirror, which can help stabilize the image on the image sensor, even when the camera is not steady.

This Summary is provided to introduce simplified concepts of techniques and apparatuses including a mirror-based microelectromechanical system for optical image stabilization in image-capture systems, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of techniques and apparatuses including a mirror-based microelectromechanical system (MEMS) for optical image stabilization in image-capture systems are described in this document with reference to the following drawings. The same numbers are used throughout the drawings to reference like features and components.

DETAILED DESCRIPTION

This document describes techniques and apparatuses including a mirror-based microelectromechanical system (MEMS) for optical image stabilization in image-capture systems. Because the shape and thickness of mobile devices can limit zoom ratios (telephoto or magnification "×" factors, like 3× or 5×), many mobile devices rely on a folded zoom architecture. In this architecture, a prism reflects light 90 degrees toward an image sensor to take advantage of a longer dimension of the mobile device. In a zoom mode, the value of consistent and accurate image stabilization increases, because small motions of the mobile device can cause more image instability. Optical image stabilization (OIS) is used to improve photo quality and reduce the negative effects of device movement on the image quality. In some devices, an OIS system uses a motion sensor to detect device movement and then moves the prism to compensate for the device motion and keep the image focused properly.

In general, OIS implementation is through angular pitch and yaw adjustments of the prism, using ball- or spring-type voice-coil motor (VCM) components so that the image focused onto the image sensor remains stable. As higher zoom ratios are commonly preferred by users, current suppression ratio (SR) values are no longer adequate to provide quick and accurate image stabilization. One problem is that the position-sensing mechanism may use Hall sensors, which do not always provide enough accuracy in determining the position of the prism for higher zoom ratios and are susceptible to external magnetic interference. Further, at those higher zoom ratios, the prism is performed more often and more rapidly, and the VCM mechanism cannot always move the prism fast enough. By replacing the prism with a mirror and replacing the VCM system with a microelectromechanical system (MEMS), the described techniques allow faster adjustment, shorter settling time to an accurate position, and a higher SR, which provides improved image stabilization, especially at higher zoom ratios.

Figure 1:
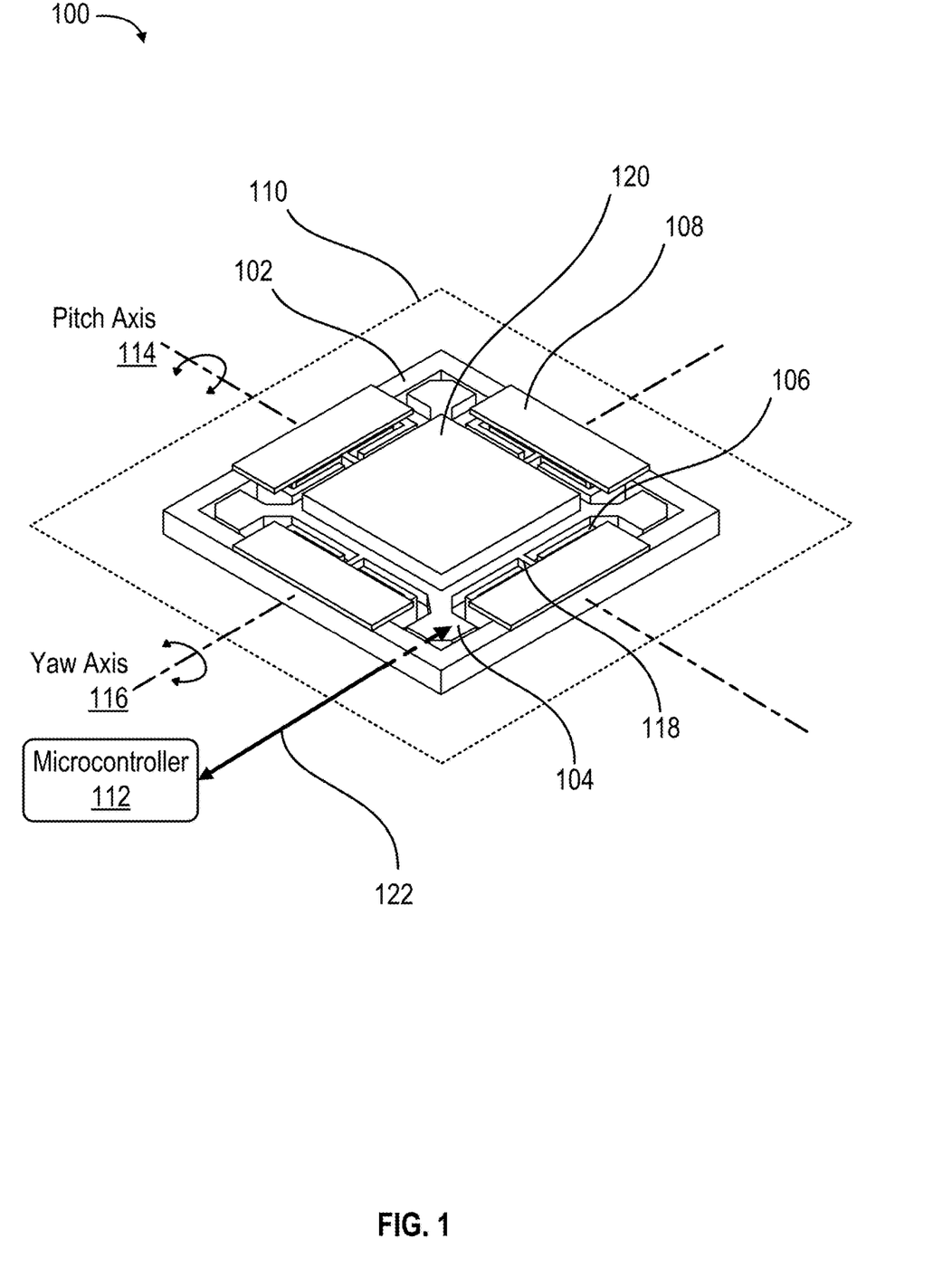
FIG. 1 illustrates a mirror-based MEMS for optical image stabilization in image-capture systems.

FIG. 1 illustrates a mirror-based MEMS 100 for optical image stabilization in image-capture systems. The mirror-based MEMS 100 includes a MEMS stationary frame 102, a MEMS platform 104, one or more MEMS rotors 106, one or more piezo films 108, a MEMS mirror 110, and a microcontroller 112. The MEMS stationary frame 102 can be configured to be electrically coupled to a substrate (not shown in FIG. 1). The electrical coupling can provide a communication path between the MEMS stationary frame 102 and another electronic device that is coupled to the substrate (e.g., a camera in a mobile device). For example, the MEMS stationary frame 102 may be configured for attachment to a printed circuit board (PCB) that includes electrical connections to other devices. In some implementations, the MEMS stationary frame 102 may be glued to the PCB for mechanical strength and electrically coupled to the PCB using bond wires that are connected to the MEMS stationary frame 102 and to respective bonding pads on the PCB.

The MEMS platform 104 can be electrically and rotationally coupled to the MEMS stationary frame 102 and configured for rotational motion about a pitch axis 114 or a yaw axis 116 (or both) with respect to the MEMS stationary frame 102 (e.g., the MEMS platform 104 may rotate about the pitch axis 114, the yaw axis 116, or both axes simultaneously). The pitch axis 114 and the yaw axis 116 may correspond to tilt and pan axes of a camera in an electronic device in which the mirror-based MEMS 100 is incorporated (e.g., a mobile phone). The physical connection (e.g., the rotational coupling) between the MEMS platform 104 and the MEMS stationary frame 102 may be implemented in any suitable manner, including with one or more MEMS bridges 118 (e.g., flexible MEMS silicon bridges or torsion bars) that can twist to allow the MEMS platform 104 to rotate about the pitch axis 114 and/or the yaw axis 116 (for clarity, only one MEMS bridge 118 is labeled in FIG. 1).

In some implementations, the MEMS platform 104 and the MEMS stationary frame 102 can be a single MEMS component, fabricated with four MEMS bridges 118 connecting the MEMS platform 104 and the MEMS stationary frame 102. The MEMS platform 104 may include a portion that is thicker than other portions in order to support the MEMS mirror 110 (e.g., with separation from the MEMS stationary frame 102). For example, as illustrated in FIG. 1, the MEMS platform 104 includes a thicker center portion 120 that can support the MEMS mirror 110 with separation from the rest of the MEMS 100 (the separation is shown in greater detail in FIG. 3). As shown, the thicker center portion 120 is a square, but the thicker center portion 120 can be fabricated with different shapes, sizes, and thicknesses.

The one or more MEMS rotors 106 can be provided between the MEMS stationary frame 102 and the MEMS platform 104. The one or more MEMS rotors 106 can be configured to drive rotational motion of the MEMS platform 104 about the pitch axis 114 and/or the yaw axis 116 (this motion may also be referred to as angular motion). The angular or rotational motion is created based on contraction and elongation of the one or more MEMS rotors 106, based on an input voltage (e.g., provided via the microcontroller 112). The one or more MEMS rotors 106 may be comb actuators or another suitable component that can drive the rotational motion about the pitch axis 114 and/or the yaw axis 116, based on the input voltage. For example, the mirror-based MEMS 100 may include four MEMS rotors 106, as shown in FIG. 1 (for clarity, only one MEMS rotor 106 is labeled in FIG. 1).

The one or more piezo films 108 can be flexibly connected to the MEMS stationary frame 102 and extend over the at one or more MEMS rotors 106. The one or more piezo films 108 may be configured to have an electrical resistance value when not deformed by the one or more MEMS rotors 106 and to have another electrical resistance value when deformed by the one or more MEMS rotors 106. The other electrical resistance value can vary based on an amount of deformation. For example, the electrical resistance of the piezo films 108 can vary in proportion to the amount of deformation (e.g., by any proportional relationship, including a linear proportion) or based on another type of relationship between the electrical resistance and the amount of deformation. The one or more piezo films 108 may be further configured to form a bridge circuit across the MEMS stationary frame 102 and the MEMS platform 104. The bridge circuit can be any of a variety of circuits configured to use the changing resistance value of the piezo films 108 to determine the amount of rotation of the MEMS platform 104.

Figure 2:
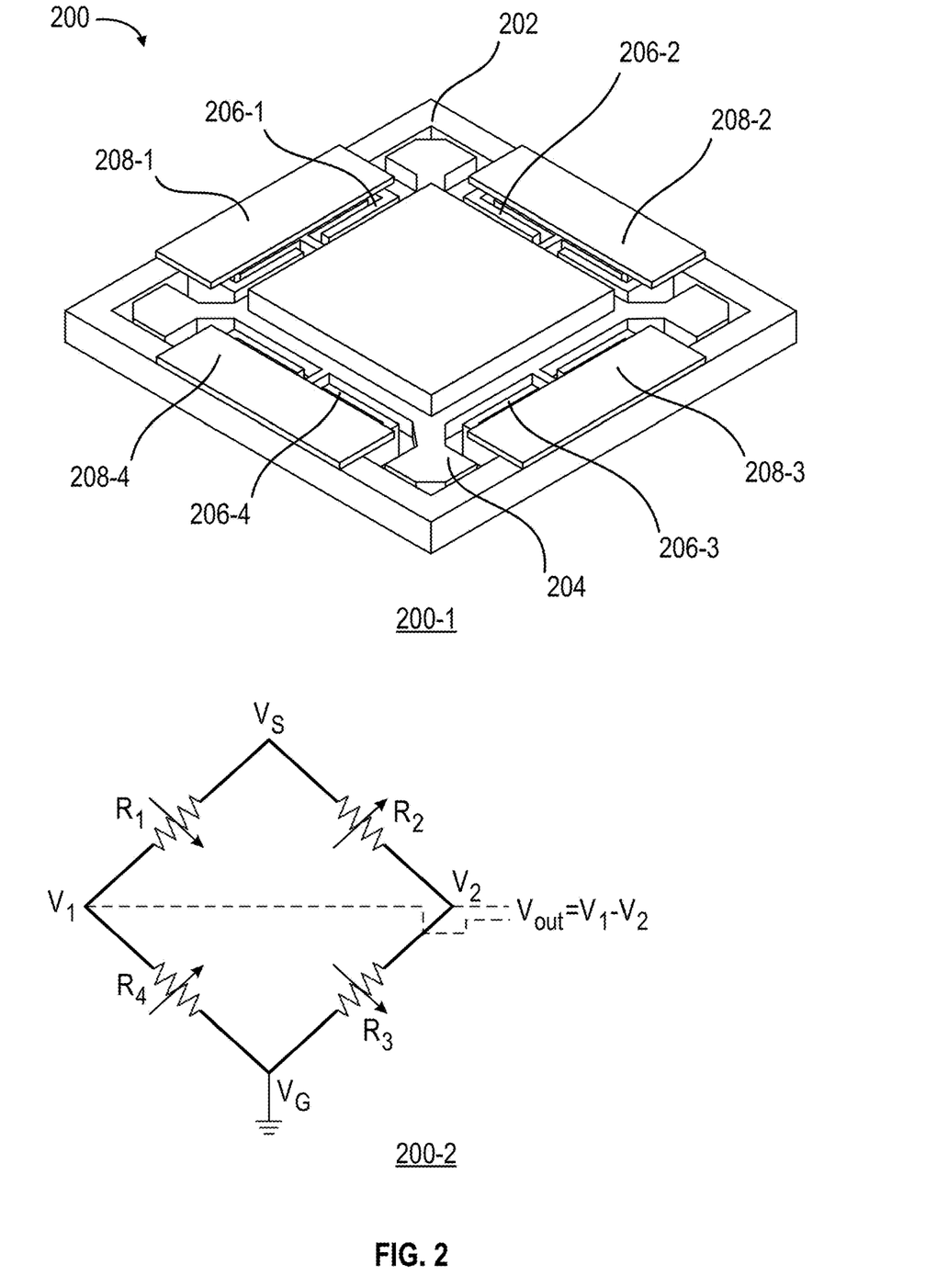
FIG. 2 illustrates an example implementation of the mirror-based MEMS of FIG. 1 that includes four piezo films configured as a Wheatstone bridge.

FIG. 2 illustrates an example implementation 200 of the mirror-based MEMS 100 that includes four piezo films 208 configured as a Wheatstone bridge. As shown in a detail view 200-1, the example implementation 200 includes a MEMS stationary frame 202, a MEMS platform 204, four MEMS rotors 206, and four piezo films 208 (for clarity, the MEMS mirror is not shown). Another detail view 200-2 illustrates an example schematic for the Wheatstone bridge configuration. The resistors R1, R2, R3, and R4 correspond to the four piezo films 208-1, 208-2, 208-3, and 208-4. A supply voltage $V_S$ is provided (e.g., via the microcontroller 112 or another source), and resulting voltages $V_1$ and $V_2$ can be determined. An output voltage, $V_{OUT}$, can be calculated as $V_1-V_2$. In some implementations, $V_{OUT}$ may be connected to an input of a measurement circuit (e.g., an integrated circuit) that is tuned for measuring voltage differences.

As described with respect to FIG. 1, the MEMS rotors 206 can cause rotational or angular motion of the MEMS platform 204 by contracting and elongating in response to an input voltage. In conjunction with the angular or rotational motion, the contraction and elongation can cause a deflection or deformation of one or more of the piezo films 208. As the piezo films 208 flex, a resistance value (e.g., in ohms) of the corresponding resistors R1-R4 change. As the resistance changes, the value of $V_{OUT}$ varies, which allows the amount of rotation about the pitch and yaw axes of the MEMS platform 204 to be accurately determined. Because the resistance values of the piezo films 208 (or 108) are not susceptible to external magnetic interference, neither is the value of $V_{OUT}$ and, thus, the estimation or determination of the rotational motion of the MEMS platform 204 (or 104) is immune to external magnetic interference, which can improve the accuracy of the determination.

Returning to FIG. 1, the MEMS mirror 110 is coupled to the MEMS platform 104 and configured to reflect light rays to an image sensor of a camera that is communicatively connected to the substrate. The MEMS mirror may be a separate component that is attached to the MEMS platform 104 (e.g., using an adhesive or a mechanical fastening technique) or fabricated as part of the MEMS platform 104. The mirror can be any of a variety of suitable shapes and/or thicknesses that enable it to receive light rays (e.g., via a lens of the camera) and reflect the light rays to an image sensor of the camera.

Figure 3:
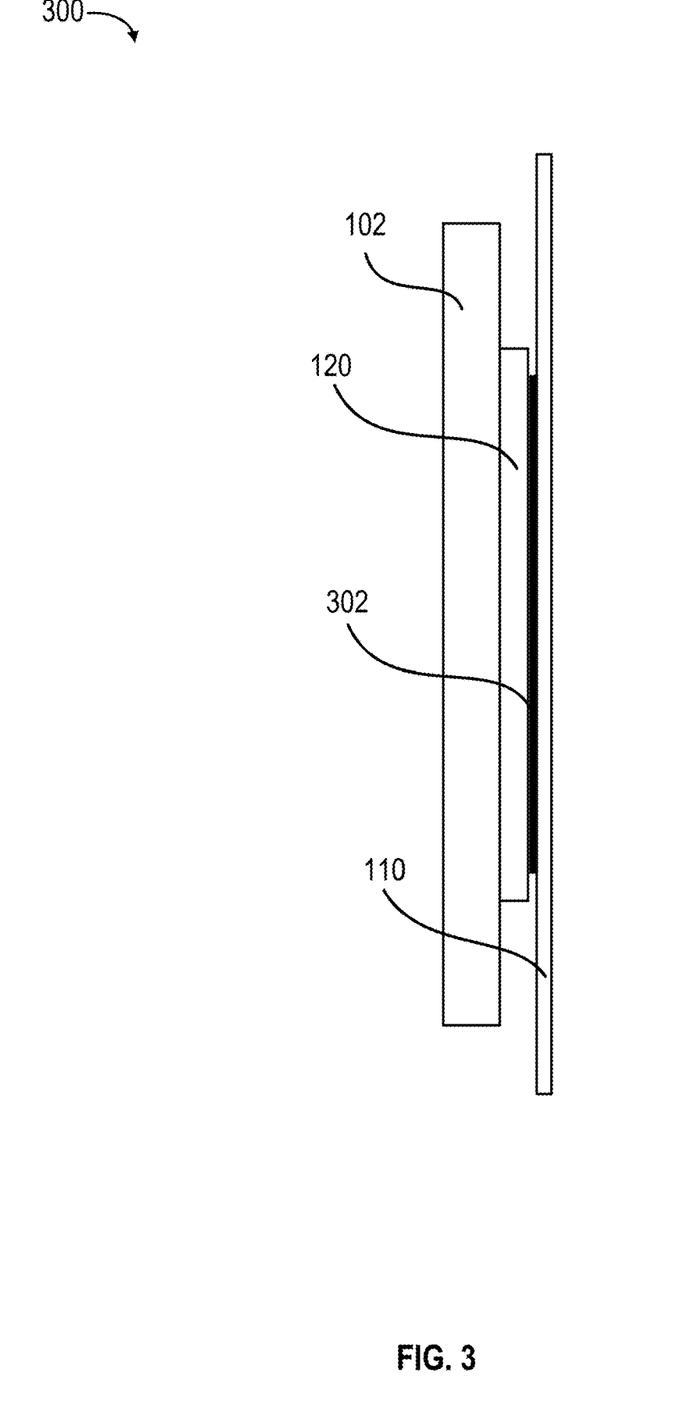
FIG. 3 illustrates an example of the MEMS mirror attached to the mirror-based MEMS of FIG. 1.

FIG. 3 illustrates an example 300 of how the MEMS mirror 110 can be attached to the mirror-based MEMS 100. The MEMS stationary frame 102, the thicker portion 120 of the MEMS platform 104, and the MEMS mirror 110 are shown in a plan view (other components are omitted from FIG. 3 for clarity). In the example 300, the MEMS mirror 110 is attached to the MEMS platform 104 with an adhesive 302, but other methods of attachment may be used.

Returning again to FIG. 1, the microcontroller 112 can be electrically connected to the MEMS platform 104, which is represented by a double-ended arrow 122. The microcontroller 112 may be configured to receive pitch and yaw orientation information from the camera. The pitch and yaw orientation information can indicate a camera-pitch angle and a camera-yaw angle (e.g., camera pan and tilt position information). For example, the camera or the electronic device hosting the camera can include an accelerometer or a gyroscopic sensor (e.g., a fiber optic gyroscopic sensor or a MEMS gyroscopic sensor) that can communicate the pitch and yaw orientation information to the microcontroller 112.

The microcontroller 112 can also access the output voltage $V_{OUT}$ and determine a mirror-pitch angle of the MEMS mirror 110 and a mirror-yaw angle of the MEMS mirror 110, based on $V_{OUT}$. The mirror-pitch angle and a mirror-yaw angle are the angles the MEMS mirror 110 needs to move about the pitch axis 114 and the yaw axis 166, respectively, to compensate for the rotation of the camera and stabilize the image (e.g., the reflected light rays) on the image sensor.

Figure 4:
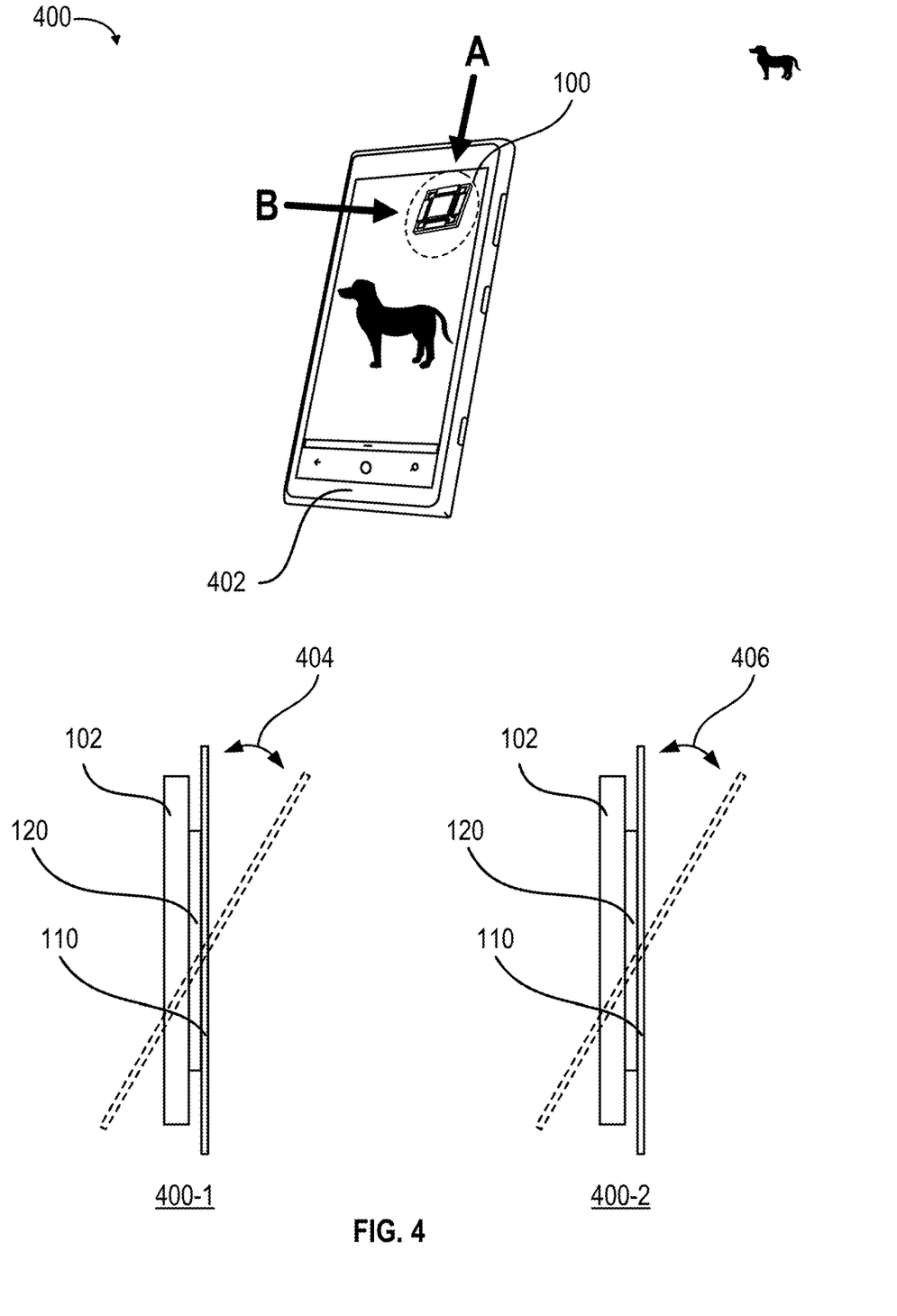
FIG. 4 illustrates the mirror-based MEMS of FIG. 1 integrated with an electronic device that includes a folded zoom camera such as illustrated in FIG. 5.

Consider FIG. 4, which illustrates the mirror-based MEMS 100 integrated with an electronic device 402 (in this example, a smartphone). The electronic device 402 includes a folded zoom or telephoto camera that is being used to capture an image of a dog. A detail view 400-1 illustrates the mirror-based MEMS 100 from a perspective represented by an arrow A. In the detail view 400-1, an angle 404 represents the mirror-yaw angle (pan). Similarly, a detail view 400-2 illustrates the mirror-based MEMS 100 from a perspective represented by another arrow B. In the detail view 400-2, an angle 406 represents the mirror-pitch angle (tilt).

Returning to FIG. 1, the microcontroller 112 can control the rotational motion of the MEMS platform 104 by using the MEMS rotors 106 to compensate for the camera-pitch angle and the camera-yaw angle, based on the mirror-pitch angle of the MEMS mirror 110 and the mirror-yaw angle of the MEMS mirror 110. The microcontroller 112 can use the measurement of the mirror-pitch angle and the mirror-yaw angle to determine when the MEMS mirror 110 is in a correct orientation to compensate for the camera-pitch angle and the camera-yaw angle. In this way, the microcontroller 112 can control the MEMS rotors 106 to move the MEMS mirror 110 so that the image is stabilized.

Consider an example in which the gyroscopic sensor detects that the camera has rotated one degree about the pitch axis and sends this camera-pitch angle (e.g., pitch orientation information) to the microcontroller 112. The microcontroller 112 then drives the MEMS rotors 106 to move the MEMS mirror 110 one degree in the opposite direction about the pitch axis. As the MEMS rotors 106 move the MEMS mirror 110, one or more of the piezo films 108 will deflect, changing the corresponding resistance values of the deflected piezo films 108. The changing resistance values affect the value of $V_{OUT}$ (e.g., when the bridge circuit is in the Wheatstone configuration) and allow an accurate determination of the position of the MEMS mirror 110.

In some implementations, the mirror-based MEMS 100 includes a MEMS-driver integrated circuit (IC). The MEMS-driver IC can receive control signals from the microcontroller 112, and then the MEMS-driver IC can control and drive the MEMS rotors 106 to move the MEMS platform 104 (and the MEMS mirror 110), based on the control signals.

The mirror-based MEMS 100 may also include a piezo-gauge sensing IC. The piezo-gauge sensing IC can be configured to sense the changing resistance values of the one or more MEMS piezo films 108 and determine the rotational motion of the MEMS platform 104 based on the changed resistance value and, thus, determine the angular position of the MEMS mirror 110 (e.g., the mirror-pitch angle and the mirror-yaw angle of the MEMS mirror 110). The piezo-gauge sensing IC can then provide the mirror-pitch angle and the mirror-yaw angle to the microcontroller 112 (and/or the MEMS driver IC), which can cause the MEMS mirror 110 to stop at the correct position.

As described above, the suppression ratio (SR) for many OIS systems is inadequate to provide higher-quality stabilization, especially at higher zoom ratios. Typically, image stabilization is measured by a metric known as suppression ratio (SR). The SR is calculated using images of a target pattern that are captured with an OIS system on and then the same images with the OIS system off. The images are used to compute a ratio of an amount of offset between the images (e.g., blur) between the images with the OIS system on and the OIS system off. For example, one or more dimensions (e.g., width and/or height) of an image of a target pattern taken with no blurring, D0 (e.g., an ideal image with no blur or vibration) can be measures and compared with (a) those dimensions of an image of the target pattern taken with the subject OIS system off, D1, and those dimensions of another image of the target pattern taken with the subject OIS system on, D2. The SR can be calculated by, for example, SR [dB]=20 log [(D1−S0)/(D2−S0)]. Typical VCM and prism-based OIS systems may have SR values of approximately 30 dB. In contrast, an OIS system that implements the described techniques can have an SR between approximately 30 dB and approximately 60 dB (e.g., 30 dB, 35 dB, 40 dB, 45, dB, 50 dB, 55 dB, or 60 dB).

Figure 5:
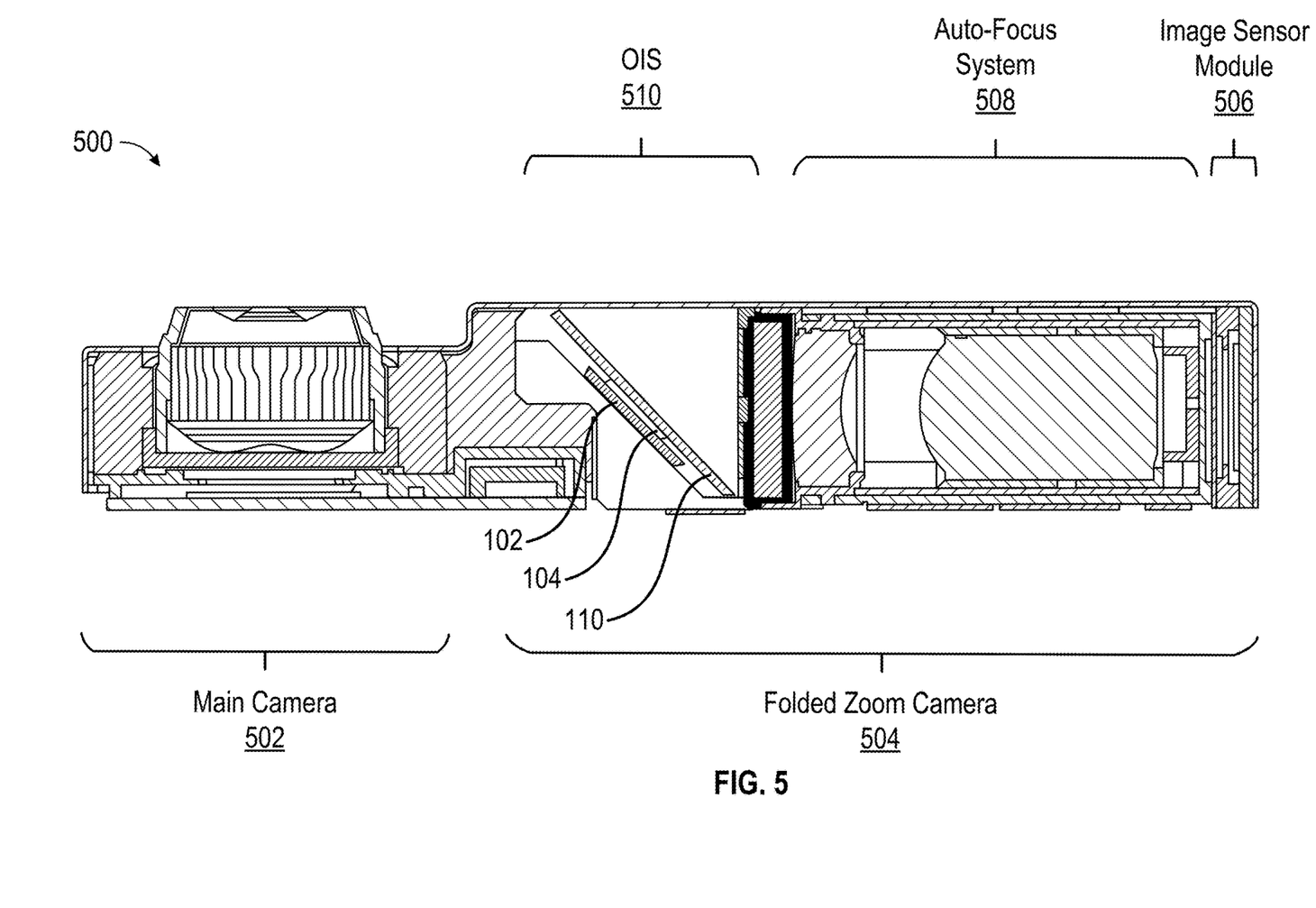
FIG. 5 illustrates an example electronic device with a folded zoom camera including the mirror-based MEMS for optical image stabilization in image-capture systems of FIG. 1.

FIG. 5 illustrates various components of an example electronic device 500 that can implement the mirror-based microelectromechanical system (MEMS) for optical image stabilization in image-capture systems as described with reference to the previous FIGS. 1-4. The example electronic device 500 includes a main camera 502 and a folded zoom camera 504. The folded zoom camera 504 includes an image sensor module 506, an auto-focus system 508, and an optical image stabilization (OIS) system 510 (e.g., the mirror-based MEMS 100). As shown, the OIS system 510 includes the MEMS stationary frame 102, the MEMS platform 104, and the MEMS mirror 110. For clarity, other components of the mirror-based MEMS 100 may be omitted in FIG. 5.

Although concepts of techniques and apparatuses, including the mirror-based MEMS for optical image stabilization in image-capture systems, have been described in language specific to techniques and/or apparatuses, it is to be understood that the subject of the appended claims is not necessarily limited to the specific techniques or apparatuses described. Rather, the specific techniques and apparatuses are disclosed as example implementations of ways in which the mirror-based MEMS for optical image stabilization in image-capture systems may be implemented.

What is claimed is:

1. An apparatus comprising:
   a microelectromechanical system (MEMS) stationary frame configured to be electrically connected to a substrate;
   a MEMS platform electrically and rotationally coupled to the MEMS stationary frame and configured for rotational motion about one or more of a pitch axis or a yaw axis with respect to the MEMS stationary frame;
   one or more MEMS rotors provided between the MEMS stationary frame and the MEMS platform and configured to drive the rotational motion of the MEMS platform;
   one or more piezo films flexibly connected to the stationary frame and extending over the one or more MEMS rotors, the one or more piezo films configured to:
   have a first electrical resistance value when not deformed by the one or more MEMS rotors;

have a second electrical resistance value when deformed by the one or more MEMS rotors, the second electrical resistance value varying based on an amount of deformation; and form a bridge circuit across the MEMS platform, the bridge circuit configured to produce an output voltage based on the first and second electrical resistance values;

a MEMS mirror coupled to the MEMS platform and configured to reflect light rays to an image sensor of a camera that is communicatively connected to the substrate; and a microcontroller electrically connected to the MEMS platform and configured to:

receive pitch and yaw orientation information of the camera, the pitch and yaw orientation information indicating a camera-pitch angle and a camera-yaw angle;

access the output voltage;

determine a mirror-pitch angle of the MEMS mirror and a mirror-yaw angle of the MEMS mirror, based on the output voltage; and control the rotational motion of the MEMS platform, using the MEMS rotors, to compensate for the camera-pitch angle and the camera-yaw angle and based on the mirror-pitch angle of the MEMS mirror and the mirror-yaw angle of the MEMS mirror.

2. The apparatus of claim 1, wherein the camera comprises a folded zoom camera.

3. The apparatus of claim 1, wherein a suppression ratio (SR) provided by the apparatus is between approximately 30 dB and approximately 60 dB.

4. The apparatus of claim 3, wherein the SR is a measure of image stabilization.

5. The apparatus of claim 1, wherein the bridge circuit comprises four piezo films configured as a Wheatstone bridge.

6. The apparatus of claim 1, wherein the MEMS stationary frame being electrically connected to the substrate provides a communication path to an electronic device that includes the camera.

7. The apparatus of claim 1, wherein the rotational coupling between the MEMS stationary frame and the MEMS platform comprises one or more flexible MEMS silicon bridges.

8. The apparatus of claim 1, wherein the rotational motion is created based on contraction and elongation of the one or more MEMS rotors, based on an input voltage.

9. The apparatus of claim 1, wherein the microcontroller is further configured to receive the pitch and yaw orientation information from a gyroscopic sensor in electrical communication with the camera.

10. The apparatus of claim 1, further comprising a MEMS driver integrated circuit (IC), the MEMS driver IC configured to:

receive control signals from the microcontroller; and control the one or more MEMS rotors to move the MEMS platform, based on the control signals.

11. The apparatus of claim 1, further comprising a piezo-gauge sensing integrated circuit (IC), the piezo-gauge sensing IC configured to:

sense a change in the electrical resistance value of the one or more piezo films from the first electrical resistance value to the second electrical resistance value;

determine the rotational motion of the MEMS platform based on the change in the electrical resistance value;

determine, based on the rotational motion, the mirror-pitch angle and the mirror-yaw angle of the MEMS mirror; and provide the mirror-pitch angle and the mirror-yaw angle to the microcontroller.

12. The apparatus of claim 1, wherein the MEMS mirror is attached to a portion of the MEMS platform that is thicker than other portions.

* * * * *